United States Patent [19]

Trommer

[11] Patent Number: 5,052,518
[45] Date of Patent: Oct. 1, 1991

[54] LUBRICATION SYSTEM FOR OVERRUNNING CLUTCHES

[75] Inventor: William C. Trommer, Rockford, Ill.

[73] Assignee: Sundstrand Corporation, Rockford, Ill.

[21] Appl. No.: 477,500

[22] Filed: Feb. 9, 1990

[51] Int. Cl.$^5$ .............................................. F16D 13/74
[52] U.S. Cl. ............................ 184/6.12; 192/113 B
[58] Field of Search ................... 184/6.12; 192/113 B, 192/41 A, 4 J; 74/7 C; 464/7, 15

[56] References Cited

U.S. PATENT DOCUMENTS

| | | | |
|---|---|---|---|
| 535,738 | 3/1895 | Smith | 192/113 B |
| 4,046,239 | 9/1977 | Tinholt | 192/58 B |
| 4,131,188 | 12/1978 | Charchian | 192/113 B |
| 4,191,279 | 3/1980 | Brown | 192/113 B |
| 4,519,373 | 5/1985 | Hardy et al. | 192/113 B |
| 4,714,803 | 12/1987 | Lederman | 192/113 B |
| 4,771,864 | 9/1988 | Lorimor et al. | 184/6 |

FOREIGN PATENT DOCUMENTS 0214965  3/1968  U.S.S.R. .................................. 464/7

*Primary Examiner*—Ira S. Lazarus
*Assistant Examiner*—Alan B. Cariaso
*Attorney, Agent, or Firm*—Antonelli, Terry, Stout & Kraus

[57] ABSTRACT

A lubricating system for an overrunning sprag clutch assembly (1) interposed between a rotatable drive (18) and a driven member (10). A lubricating fluid is supplied to the clutch assembly (1) and a lubricating dam (11) is formed on respective axial sides of the clutch assembly (1) thereby ensuring an adequate lubrication of the clutch assembly (1) during operative and nonoperative conditions thereof.

7 Claims, 1 Drawing Sheet

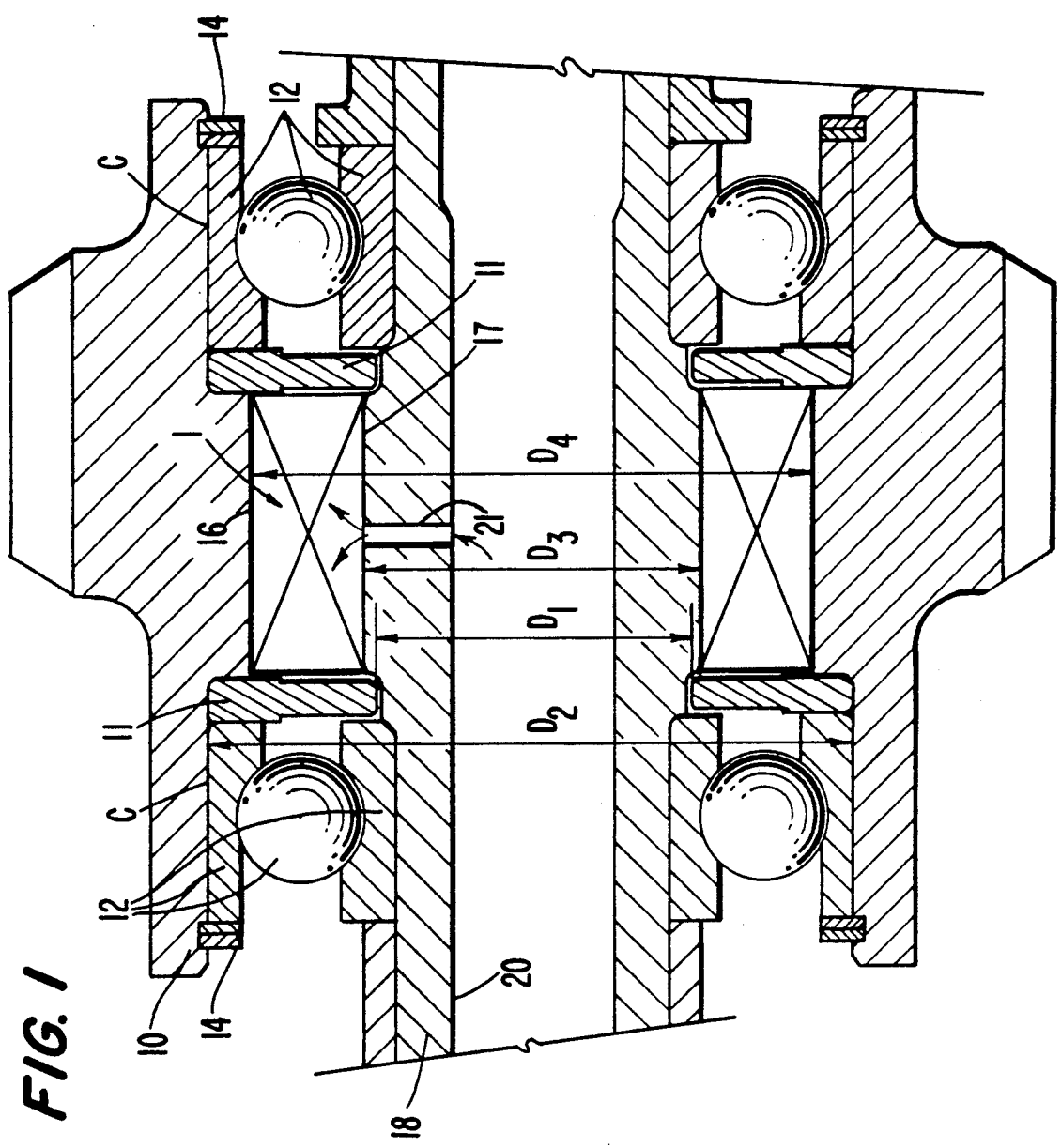
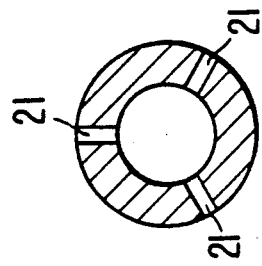

LUBRICATION SYSTEM FOR OVERRUNNING CLUTCHES

DESCRIPTION

1. Technical Field

The present invention relates to a lubrication arrangement and, more particularly, to a lubrication system for clutches and, in particular, overrunning clutches.

Lubrication arrangements have been proposed in, for example, U.S. Pat. No. 4,771,864 wherein a lubricant spline joint provides a viscous damping function, with the spline joint including a first member defining an internal spline, and a second member defining an external spline engaged therewith. A seal ring is disposed between the members at one end of the splines, and a radially inwardly facing chamber is provided at the other end of the splines which is exposed to a lubricating fluid. The chamber is supplied with a lubricating fluid by a centrifugal action of the rotating members, and an annular barrier limits a maximum centrifugal pressure head to a preselected range of values corresponding to a speed of rotation of the spline joint. The internal annular barrier includes an internal cylindrical surface formed within a housing member defining an internal radius from a center longitudinal axis. Radially oriented passages communicate with the internal cylindrical surface to limit an amount of lubricating fluid collected on the internal surface to a fixed value. An annular fluid mass provides a desired centrifugal pressure head range for the lubricated spline joint.

In, for example, U.S. Pat. No. 474,803, an overrunning clutch arrangement is provided which includes a sealing member adapted to radially float along a cage of the clutch in order to maintain the sealing member in an equilibrium sealing condition relative to an eccentrically moving clutch race so as to block lubricant leakage without increasing friction.

While the above-proposed arrangements more or less provide for lubrication of components of the respective elements, neither proposed arrangement is directed at insuring a continuous flow of lubricate and a minimization of excess heat buildup so as to enable a maintenance of a manageable lubricant temperature.

DISCLOSURE OF INVENTION

The present invention essentially resides in providing a lubrication arrangement for a clutch system such as, for example, an overrunning clutch, which insures a submergence of inner and outer contact race areas of the clutch in the lubricating fluid during a dynamic engagement between the inner and outer contact races as well as the supply of lubricant to other elements of the clutch assembly while at the same time minimizing excessive heat buildup and maintenance of management lubricant temperatures.

In accordance with advantageous features of the present invention, a lubrication system for an overrunning clutch, such as, for example, a sprag clutch for starter motors of auxiliary power units of aircraft, is provided with the lubrication system including means for insuring a formation of lubrication dams during both operation and non-operation of the clutch arrangement.

In accordance with the present invention, a clutch assembly is disposed between an inner contacting race and outer contacting race, with the inner contacting race being integral with a driving member such as a shaft and an outer contact race being integrally formed with an output member such as a gear. As the shaft begins to accelerate in a clutch driving direction, the clutch assembly is forced to accelerate at its own rate until the contacting surfaces, i.e., the inner and outer contacting races, synchronized in speed. During this period of time when the shaft and clutch assembly are not rotating at a synchronous speed, there is a potential for wear between the shaft and the inner contact surfaces of the sprag at the inner contact race. Multiplying the wear that results from this condition by a high number of total starts that exist over a lifetime of a sprag clutch assembly, there is a potential for excessive wear causing a premature sprag clutch failure.

The present invention minimizes if not avoids the occurrence of excessive wear by insuring that an adequate lubrication is maintained at the inner contact race during the entire acceleration portion of operation.

Likewise, when the two contact surfaces are not synchronized in speed, a similar wear occurs at the outer contact race but in reverse. More particularly, the sprag clutch assembly accelerates ahead of the output gear and, consequently, a constant lubrication is necessary at the outer contact race in order to minimize if not avoid any excessive wear in the area of the outer contact race thereby causing a premature sprag clutch failure.

Additionally, in overrunning clutches, such as, for example, a sprag clutch, failure to provide adequate lubrication either at the inner contact race or the outer contact race during an acceleration may lead to a chattering between the contacting surfaces thereby leading to a possible premature wear of the elements of the clutch assembly and/or the inner and outer contact races which, in turn, can lead to an ultimate failure in operation of the clutch assembly.

In order to insure a retention of a volume of lubricating fluid sufficient to form the lubricating fluid dams, anti-friction bearing assembly are advantageously disposed on respective axial sides of the clutch assembly. The respective bearing assemblies axially position the lubricating fluid dams and provide a controlled clearance for acceptable eccentricity between the inner and outer contact races for proper sprag clutch assembly operation.

To compensate for or to provide a reaction to forces generated by a centrifugally induced pressure field within the cavity of the sprag clutch assembly when the output gear is rotating at a maximum speed, in accordance with further features of the present invention, retaining rings are arranged at an axial side of the bearing assemblies opposite the axial side facing the lubricating fluid dam.

Advantageously, in accordance with the present invention, an outer diameter of the lubricating fluid dams is greater than a diameter of the outer contact race and, during rotation of the output gear, the lubricating fluid is forced to totally fill an outer region of the sprag clutch assembly. The rotational motion itself creates a centrifugal pressure field in a vicinity of the outer contact race thereby causing the lubricating oil to intimately contact the outer contact race.

The inner contact race, in accordance with the present invention, has a diameter which is larger than an inside diameter of the lubricating fluid dam and, the lubricating oil is forced to flow radially inwardly, that is, inboard of the inner contact race, to escape from the oil dam. Thus, when the output gear and the sprag clutch assembly are rotating, lubricating oil totally fills the sprag clutch assembly cavity resulting in a minimization if not avoidance of excessive component wear or chattering of the elements of the sprag clutch assembly.

The above and other objects, features, and advantages of the present invention will become more apparent from the following description when taken in connection with the accompanying drawings which show, for the purpose of illustration only, one embodiment in accordance with the present invention.

BRIEF DESCRIPTION OF THE DRAWING

FIG. 1 is a partially schematic cross-sectional view of a lubrication arrangement for an overrunning clutch constructed in accordance with the present invention;

FIG. 2 is a cross-sectional view of an alternate embodiment of an overrunning clutch driving member provided with a plurality of lubricating bore means.

BEST MODE FOR CARRYING OUT THE INVENTION

Referring now to FIG. 1 of the drawing, according to this figure, an overrunning clutch assembly generally designated by the reference numeral 1, such as, for example, a sprag clutch assembly, of conventional construction, for a starter of an auxiliary power unit for aircraft, is interposed between a driving member such as, for example, a shaft 18 of a start clutch shaft assembly and a driven member such as, for example, an output gear 10. The overrunning clutch includes an outer contact race 16 and an inner contact race 17, with the inner contact race being integrally formed with or suitably secured to the shaft 18 and the outer contact race 16 being integrally formed with or suitably secured to the output gear 10 in a conventional manner. Anti-friction bearing assemblies 12, are disposed on respective sides of the clutch assembly 1, with the anti-friction bearing assemblies 12, providing a controlled clearance C for insuring an acceptable eccentricity between the inner contact race 17 and the outer contact race 16 for a proper operation of the sprag clutch assembly 1. Retaining rings 14 are provided at axial end faces of the respective bearing assemblies 12, with the retaining rings 14 reacting to an axial force generated by a centrifugally induced pressure field within the cavity of the sprag clutch assembly 1 when the output gear 10 rotates up to maximum speed.

The shaft 18 is provided with a longitudinally extending bore means 20 connected to a suitable source (not shown) of lubricating fluid such as, for example, oil. As shown in FIG. 1, a radially extending bore means 21 communicates the longitudinally extending bore means 20 with a central cavity of the sprag clutch assembly 1. Alternatively, as shown in FIG. 2, a plurality of equally spaced radially extending bore means may be circumferentially disposed about a periphery of the shaft 18, with each of the plurality of radially extending bore means 21 communicating the longitudinally extending bore means 20 with the central cavity of the sprag clutch assembly 1. The source of lubricating fluid is adapted to supply lubricating fluid under pressure even when the shaft 18 is not rotating thereby insuring the filling of the cavity of the sprag clutch assembly 1. For this purpose, the longitudinally extending bore means 20 may be connected with, for example, an oil pump of the aircraft when the sprag clutch assembly 1 is used as a starter motor for an auxiliary power unit and, when so used, the three equally spaced radially extending bore means 21 are provided in the shaft 18.

A lubricating fluid dam 11 is formed at an axial clearance between the axial endface of the respective anti-friction bearing assemblies 12, and axially spaced ends of the sprag clutch assembly 1. The fluid dam 11, by virtue of the disposition thereof, assures a retention of lubricating fluid at both the inner contact race 17 and outer contact race 16 during all dynamic operating conditions of the sprag clutch assembly 1. Lubricating fluid is constantly supplied through the radially extending bore means 21 from the longitudinally extending bore means 20 during both rotation and non-rotation of the shaft 18 by virtue of the pressurized lubricating fluid supply from the oil pump. The lubricating fluid is directed from the longitudinally directed bore means 20 through the radially extending bore means 21 in the direction of the arrows in the drawing and into a midpoint of the sprag assembly 1 so as to insure a uniform flow distribution into the cavity of the sprag clutch assembly 1.

During rotation of the output gear 10 due to the engagement of the sprag clutch assembly, the lubricating fluid dam 11 has an outer diameter $D_2$ larger than an outer diameter $D_4$ of the outer contact race 16 so that the lubricating fluid is forced to totally fill an outer region of the sprag clutch assembly 1. The rotational motion results in a creating of a centrifugal pressure field in a vicinity of the outer contact race 16 causing the lubricating fluid to intimately contact the outer contact race 16 thereby insuring an adequate lubricating thereof by the lubricating fluid Additionally, during rotation, as shown in the single figure of the drawing, the inner contact race 17 has an outer diameter $D_3$ which is larger than an inner diameter $D_1$ of the oil dam 11 so that lubricating fluid is forced to flow axially inwardly, that is, in a direction of the inner contact race 17, to enable an escape of the lubricating fluid. Thus, when the output gear 10 and sprag clutch assembly 1 are rotating, lubricating fluid completely fills the cavity sprag clutch assembly 1 and causes a formation of the lubricating fluid dam 11 thereby minimizing the potential for excessive component wear or chattering between the contact surfaces which may ultimately lead to excessive wear and premature failure of the sprag clutch assembly 1.

The controlled clearance C provided between the outer peripheral surfaces of the bearing assemblies 12, is such that the lubricating fluid is provided from escaping through the clearance C thereby insuring the formation of the lubricating fluid dam 11 during rotation of the output gear 10 and the sprag clutch assembly 1, with the lubricating fluid dam 11 having a sufficient lubricating fluid pressure head to insure sufficient lubrication of the components of the sprag clutch assembly thereby minimizing excessive heat buildup between the components of the sprag clutch assembly 1 and enabling a maintenance of manageable lubricating fluid temperatures Moreover, the controlled clearance C is selected so as to provided the necessary acceptable eccentricity between the inner contact race 17 and the outer contact race 16 for a proper operation of the sprag clutch assembly 1.

While I have shown and described only one embodiment in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. A lubrication system for an overrunning clutch means including a clutch assembly interposed between a rotatable drive means and a driven means, the clutch assembly includes an outer contact race means and an inner contact race means, the lubrication system comprises means for supplying a lubricating fluid to the clutch assembly, and means disposed on respective axial sides of said clutch assembly for forming a lubricating fluid dam on respective axial sides of said clutch assembly so as to ensure an adequate lubrication of the clutch assembly during operative and non-operative conditions thereof, an outer diameter of the lubricating dam is greater than an outer diameter of the contact race means of the clutch assembly, and an inner diameter of the lubricating dam is less than an inner diameter of the inner contact race means of the clutch assembly, wherein said means for forming a lubricating fluid dam includes a pair of bearing assembly means disposed on the respective axial sides of the clutch assembly for rotatably supporting said driven means with respect to said drive means, said means for supplying includes at least one radially extending bore means provided in said driven means for directing a supply of lubricating fluid to the clutch assembly, and wherein the driving means includes a drive shaft having a longitudinally extending bore means for receiving a lubricating fluid, said longitudinally extending bore means communicating with equally spaced multiple radially extending bore means.

2. A lubrication system according to claim 1, further comprising means acting upon said bearing assembly means for counteracting an axial force generated by a centrifugally induced pressure field within the clutch assembly.

3. A lubrication system according to claim 2, wherein the clutch assembly is a sprag clutch.

4. A lubrication system according to claim 3, wherein the driven member is a gear means adapted to drive a starter motor means.

5. A lubricating system for an overrunning clutch means including a clutch assembly interposed between a rotatable drive means and a driven means, the lubrication system comprising means for supplying a lubricating fluid to the clutch assembly, and means disposed on respective axial sides of said clutch assembly for forming a lubricating fluid dam on respective axial sides of the clutch assembly so as to ensure an adequate lubrication of the clutch assembly during operative and non-operative conditions thereof, and wherein said driving means includes a drive shaft having a longitudinally extending bore means for receiving a lubricating fluid and supplying the same to said clutch assembly.

6. A lubricating system for an overrunning clutch means including a clutch assembly interposed between a rotatable drive means and a driven means, the clutch assembly including an outer contact race means an in inner contact race means, the lubricating system comprising means for supplying a lubricating fluid to the clutch assembly, and means disposed on respective axial sides of said clutch assembly so as to ensure an adequate lubrication of the clutch assembly during operative and non-operative conditions thereof, an outer diameter of the lubricating dam is greater than an outer diameter of the outer contact race means of the clutch assembly, and an inner diameter of the lubricating dam is less than an inner diameter of the inner contact race means of the clutch assembly, wherein said means for forming a lubricating fluid dam include a pair of bearing assembly means disposed on the respective axial sides of the clutch assembly for rotatably supporting said driven means with respect to said drive means, said means for supplying includes at least one radially extending bore means provided in said driven means for directing a supply of lubricating fluid to the clutch assembly, and wherein each of the pair of bearing assembly means includes an end face disposed in opposition to a respective axial end face of the clutch assembly, the respective end faces of the bearing assembly means are axially spaced from the opposed axial end faces of the clutch assembly so as to enable a formation of the lubricating fluid dam between the opposed end faces of the bearing assembly means and the clutch assembly.

7. A lubricating system according to claim 6, wherein said means for supplying includes a pressurized lubricating fluid source.

* * * * *